United States Patent [19]
Percival

[11] Patent Number: 5,602,640
[45] Date of Patent: Feb. 11, 1997

[54] LENSMETER ACCESSORY

[75] Inventor: Christopher J. Percival, Williamsville, N.Y.

[73] Assignee: Leica Inc., Depew, N.Y.

[21] Appl. No.: 493,559

[22] Filed: Jun. 22, 1995

[51] Int. Cl.$^6$ .................................................. G01N 21/01
[52] U.S. Cl. ........................ 356/244; 356/124; 356/125; 356/126; 356/127
[58] Field of Search ................................ 356/244, 124, 356/125, 127, 126

[56] References Cited

U.S. PATENT DOCUMENTS 4,710,023  12/1987  Loveridge ............................. 356/244
4,786,144  11/1988  Epstein ................................. 356/244
5,198,867  3/1993   Campbell .............................. 356/127

Primary Examiner—Frank Gonzalez
Assistant Examiner—Reginald A. Ratliff
Attorney, Agent, or Firm—Bean, Kauffman & Spencer

[57] ABSTRACT

A lensmeter accessory is disclosed for supporting and positioning a corneal contact lens in a light path of a lensmeter. The accessory comprises a generally planer body with a tapered slot therein having a slot wall defining a recessed groove for receiving and removably holding a contact lens. The accessory may be placed on an adjustable lens platform of a lensmeter to position the contact lens in the lensmeter light path.

11 Claims, 2 Drawing Sheets

LENSMETER ACCESSORY

BACKGROUND OF THE INVENTION

The present invention relates generally to accessories for use with optical lensmeters in the measurement of optical properties of a lens, and more particularly to lensmeter accessories for supporting and positioning a corneal contact lens on a light path of a lensmeter.

Lensmeters typically include a lens platform for supporting a spectacle or eyeglass lens with its vertex point against a lens stop of the lensmeter in alignment with a light path of the lensmeter. Such lensmeters may also be used to measure the optical properties of a contact lens, however this requires that the contact lens somehow be held against the lens stop in alignment with the light path. The task of supporting and positioning a contact lens in the light path is problematic because contact lenses are difficult to handle and easy to drop, scratch, or lose.

Prior art schemes for holding a contact lens against a lensmeter lens stop in alignment with a light path of the lensmeter include using adhesives and providing the lensmeter with a generally vertical light path to enable the contact lens to rest on the lens stop by gravity.

A lensmeter accessory available for use with the Model 70 Vertometer lensmeter manufactured by Leica Inc., owner of the present application, includes a small tube having glass insert of special index which moves the focal plane of the lensmeter objective lens forward for purposes of testing a contact lens. A first end of the tube is insertable in an aperture of the lens stop and a second end of the tube comprises a spherical surface for engagement with a concave surface of the contact lens for holding the contact lens in place along the lensmeter light path.

A more recent lensmeter developed by Leica Inc., which is the subject of copending U.S. Des. patent application Ser. No. 29/031,945, has a substantially horizontal light path and a vertically adjustable lens platform. The above mentioned prior art schemes for holding a contact lens are not suited for use with the newer lensmeter.

SUMMARY OF THE INVENTION

Therefore, it is an object of the present invention to provide a lensmeter accessory which is capable of supporting and positioning a contact lens on a substantially horizontal light path of a lensmeter.

It is another object of the present invention to provide a lensmeter accessory which securely holds a contact lens without application of adhesive.

It is a further object of the present invention to provide a lensmeter accessory which is removably mountable on a lensmeter, and preferably on an eyeglass lens platform of a lensmeter.

A still further object of the present invention is to provide a lensmeter accessory which is simple and inexpensive to manufacture.

In accordance with the present invention, a lensmeter accessory comprises a generally planar body adapted for removable mounting on a lensmeter, such as on a vertically adjustable lens platform of the lensmeter. In one embodiment, a bottom support foot is provided on the lensmeter body to assist in maintaining the body in a generally upright position on the lens platform.

The body of the lensmeter accessory has an inwardly extending tapered slot alignable with a light path and lens stop of the lensmeter when the body is placed on the lens platform. The tapered slot has a wall which defines a groove of a predetermined depth for removably receiving and holding a contact lens by friction. Opposing sidewalls of the groove are preferably resiliently deformable such that when a contact lens is inserted therebetween, the sidewalls are displaced in opposite directions and are thereby loaded to exert a biasing force to hold the contact lens in place.

To use the present invention, one inserts a contact lens into the tapered slot between the groove sidewalls until it is sufficiently secure, then places the body in a generally upright position on the lens platform and adjusts the vertical position of the lens platform such that the contact lens held thereby leans against the lens stop in alignment with the lensmeter light path.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
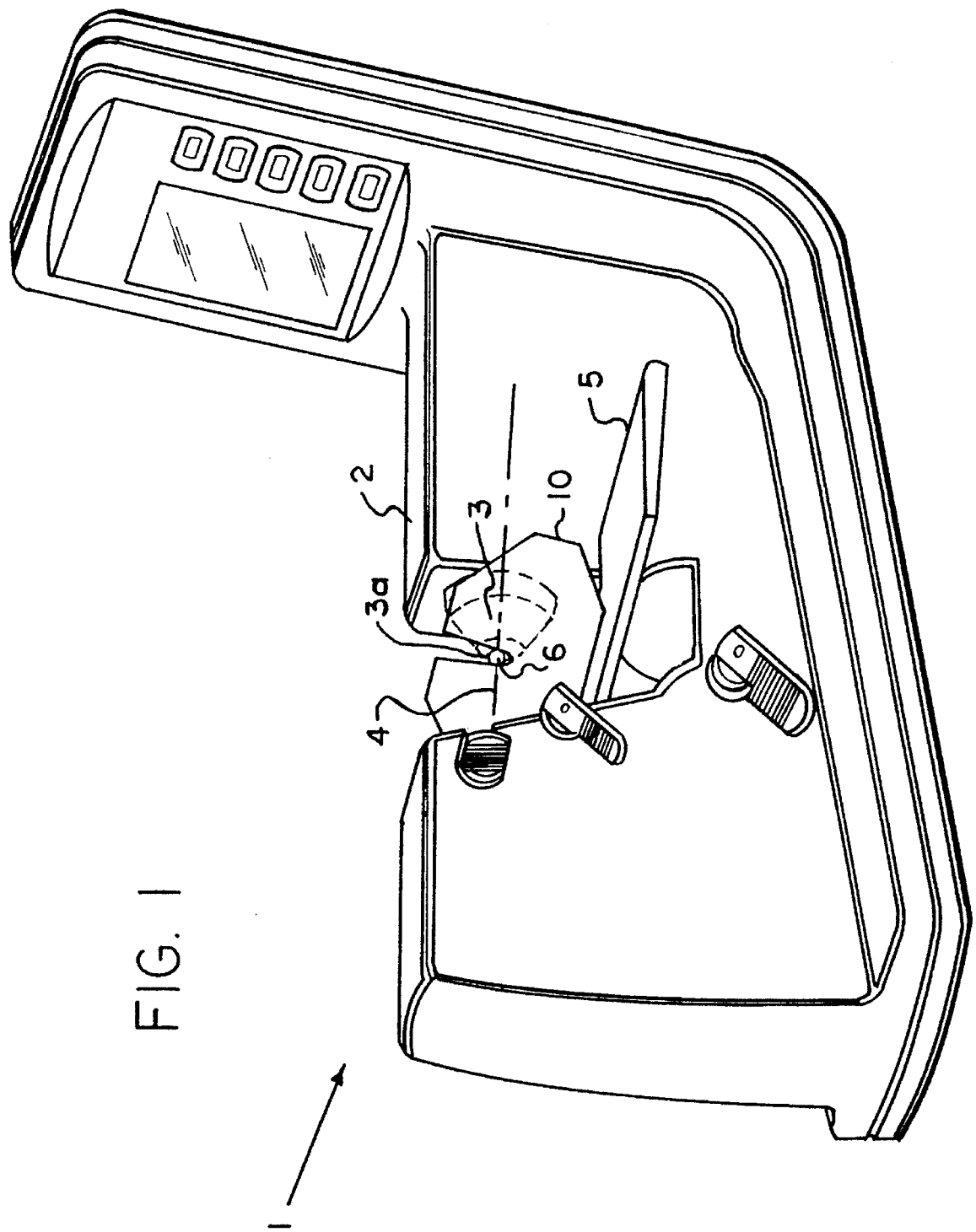
FIG. 1 is a perspective view illustrating use of a lensmeter accessory formed in accordance with the present invention to hold a contact lens for measurement by a lensmeter.

Reference is first made to FIG. 1, wherein a lensmeter 1 includes a housing 2 enclosing a light source (not shown) and a lens stop 3 with an aperture 3a for transmitting a portion of light radiating from the light source to define a light path 4. Lensmeter 1 further includes a vertically adjustable lens platform 5 suitable for supporting an eyeglass frame to enable a lens held by the frame to be positioned on light path 4. As shown in FIG. 1, lensmeter 1 may be used to measure the optical properties of a corneal contact lens 6 with the help of a lensmeter accessory 10 formed in accordance with the present invention.

Figure 2:
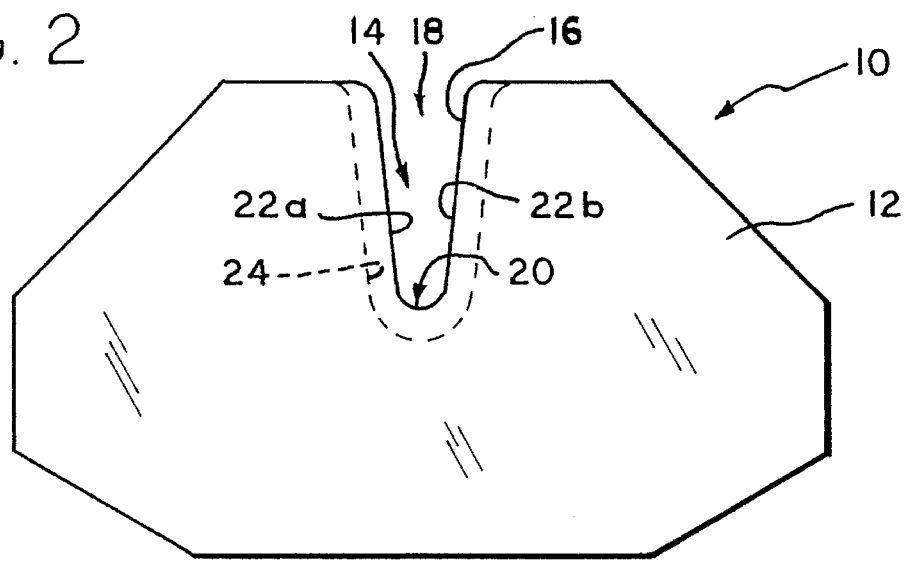
FIG. 2 is a front elevational view of a lensmeter accessory formed in accordance with the present invention.

Referring now to FIG. 2, lensmeter accessory 10 includes a generally planar body 12 having a slot 14 formed therein. Slot 14 is bounded by a slot wall 16 and extends inwardly from an open end 18 to terminate at a rounded closed end 20. Slot 14 is tapered such that opposed slot edges 22a and 22b converge in a direction from open end 18 toward closed end 20. The distance between edges 22a and 22b at open end 18 is chosen to be slightly larger than the diameter of a standard hard contact lens, typically 8 to 10 millimeters. In a preferred embodiment, edges 22a and 22b form an included angle of approximately 12 degrees.

Figure 3:
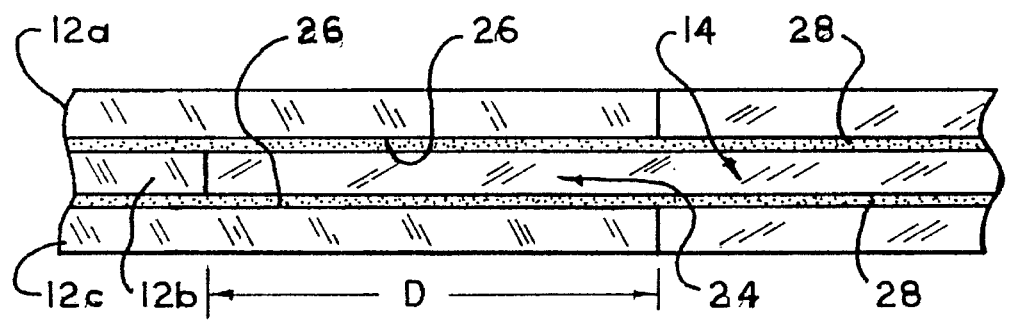
FIG. 3 is an enlarged partial top plan view thereof.

As may be understood from FIGS. 2 and 3, slot wall 16 defines a recessed groove 24 for holding a contact lens generally coplanar with body 12. Groove 24 includes a pair of opposed sidewalls 26,26 which are preferably elastically deformable, such that when a contact lens is inserted therebetween the sidewalls are displaced in opposite directions and a biasing force is exerted on the lens to hold it in place. The depth of groove 24 is preferably at least 0.03 inches and no greater than 0.125 inches.

A first method of manufacturing lensmeter accessory 10 is to form body 12 using three separate sheets or layers 12a, 12b and 12c, as may be understood from FIG. 3. Layers 12a, 12b and 12c may be formed of polycarbonate sheet approximately 0.012 inches in thickness. A pair of like-sized outer layers 12a and 12c may be fixed to opposite faces of an inner layer 12b by relatively thin adhesive layers 28, with the periphery of slot 14 formed in inner layer 12b being offset a predetermined distance from the periphery of slot 14 formed in outer layers 12a and 12c to define groove 24. Other suitable methods of manufacture are possible, including injection molding and machining.

Figure 4:
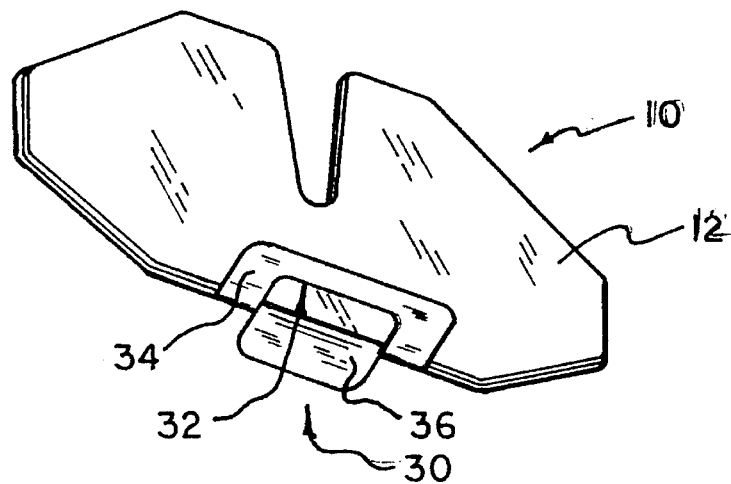
FIG. 4 is an bottom perspective view of a presently preferred embodiment lensmeter accessory formed in accordance with the present invention.

FIG. 4 illustrates a presently preferred embodiment of the present invention, wherein lensmeter accessory 10 is additionally provided with a bottom support foot 30 arranged generally orthogonal to the plane of body 12 to assist in stabilizing lensmeter accessory 10 on a lens platform of a lensmeter. In the embodiment of FIG. 4, inner layer 12b is formed from a suitably pliable metal, preferably stainless steel, and a foot extension including a U-shaped cut 32 is integrally provided. Cut 32 defines a pair of foot portions 34 and 36 which may be bent to extend in opposite horizontal directions to create foot 30.

Use of lensmeter accessory 10 is carried out by manually sliding contact lens 6 into slot 14 between sidewalls 26,26 of groove 24 until the lens is snugly held in place by friction. As depicted in FIG. 1, lensmeter accessory 10 is then placed on lens platform 5 and allowed to lean against lens stop 3 such that lens 6 is in horizontal alignment with light path 4. The vertical position of lens platform 5 may be adjusted to bring lens 6 into vertical alignment with light path 4. Upon completion of alignment, the optical properties of lens 6 may be measured by lensmeter 1, after which lensmeter accessory 10 may be removed from lens platform 5 and contact lens 6 may be removed from slot 14.

What is claimed is:

1. An accessory for supporting and positioning a corneal contact lens on a light path of a lensmeter for measurement of optical properties of said lens, said accessory comprising:

a generally planar body adapted for removable mounting on said lensmeter, said body having an inwardly extending tapered slot alignable with said light path when said body is mounted on said lensmeter, said slot having a wall defining a groove of a predetermined depth for removably holding said lens on said light path.

2. The accessory according to claim 1, wherein said groove includes elastically deformable sidewalls for holding said lens.

3. The accessory according to claim 1, wherein said predetermined depth is less than or equal to 0.125 inches.

4. The accessory according to claim 1, wherein said body comprises an inner layer having opposite faces and a pair of outer layers fixed one to each of said faces, and the periphery of said slot in said inner layer is offset from the periphery of said slot in said outer layers by said predetermined depth to define said groove.

5. The accessory according to claim 4, wherein said inner layer and said outer layers are approximately 0.012 inches thick.

6. The accessory according to claim 1, wherein said body is integrally formed by injection molding.

7. The accessory according to claim 1, wherein said body is formed by machining.

8. The accessory according to claim 1, wherein said tapered slot has an open end slightly greater than 10 millimeters across and an included angle of approximately 12 degrees.

9. The accessory according to claim 1, further including a foot portion to provide support for said body when said body is in a substantially vertical position.

10. The accessory according to claim 4, further including a foot portion to provide support for said body when said body is in a substantially vertical position.

11. The accessory according to claim 10, wherein said foot portion is integral with said inner layer.

* * * * *